No. 876,084. PATENTED JAN. 7, 1908.
C. W. PARKER.
TRANSMISSION GEARING.
APPLICATION FILED MAY 1, 1907.
2 SHEETS—SHEET 1.
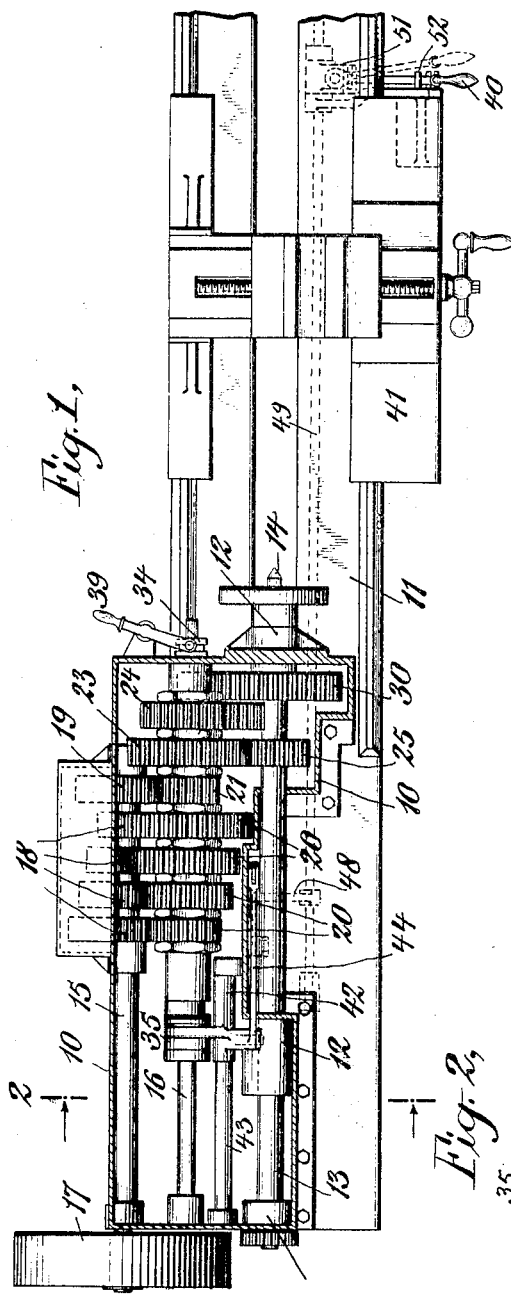
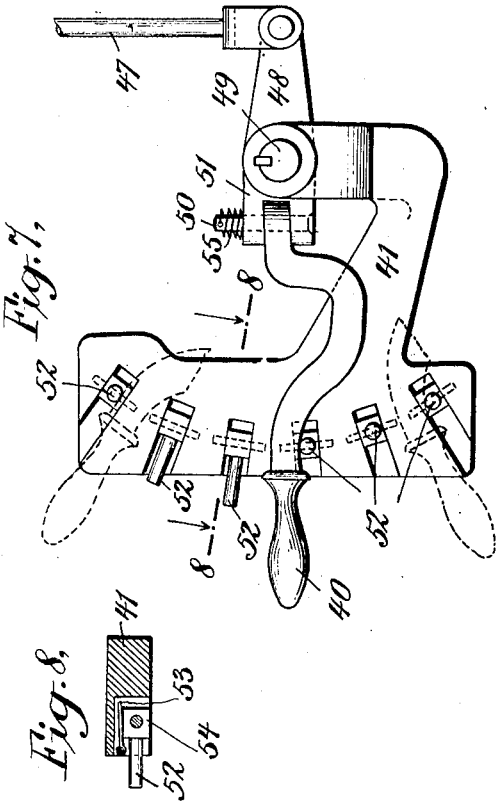
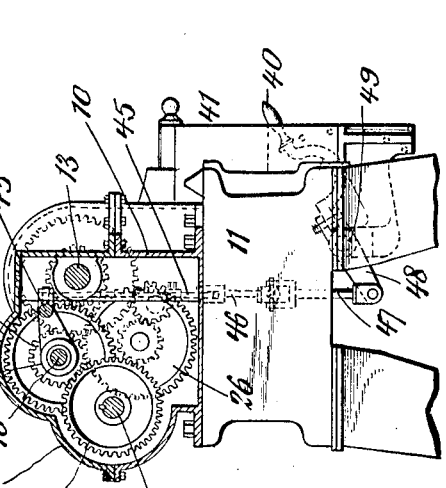
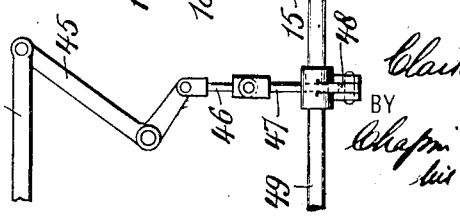
WITNESSES:
Geo. A. Klimek
Lyman S. Andrews Jr.
INVENTOR
Clark W. Parker
BY
his ATTORNEYS No. 876,084.
C. W. PARKER.
TRANSMISSION GEARING.
APPLICATION FILED MAY 1, 1907.
PATENTED JAN. 7, 1908.
2 SHEETS—SHEET 2.
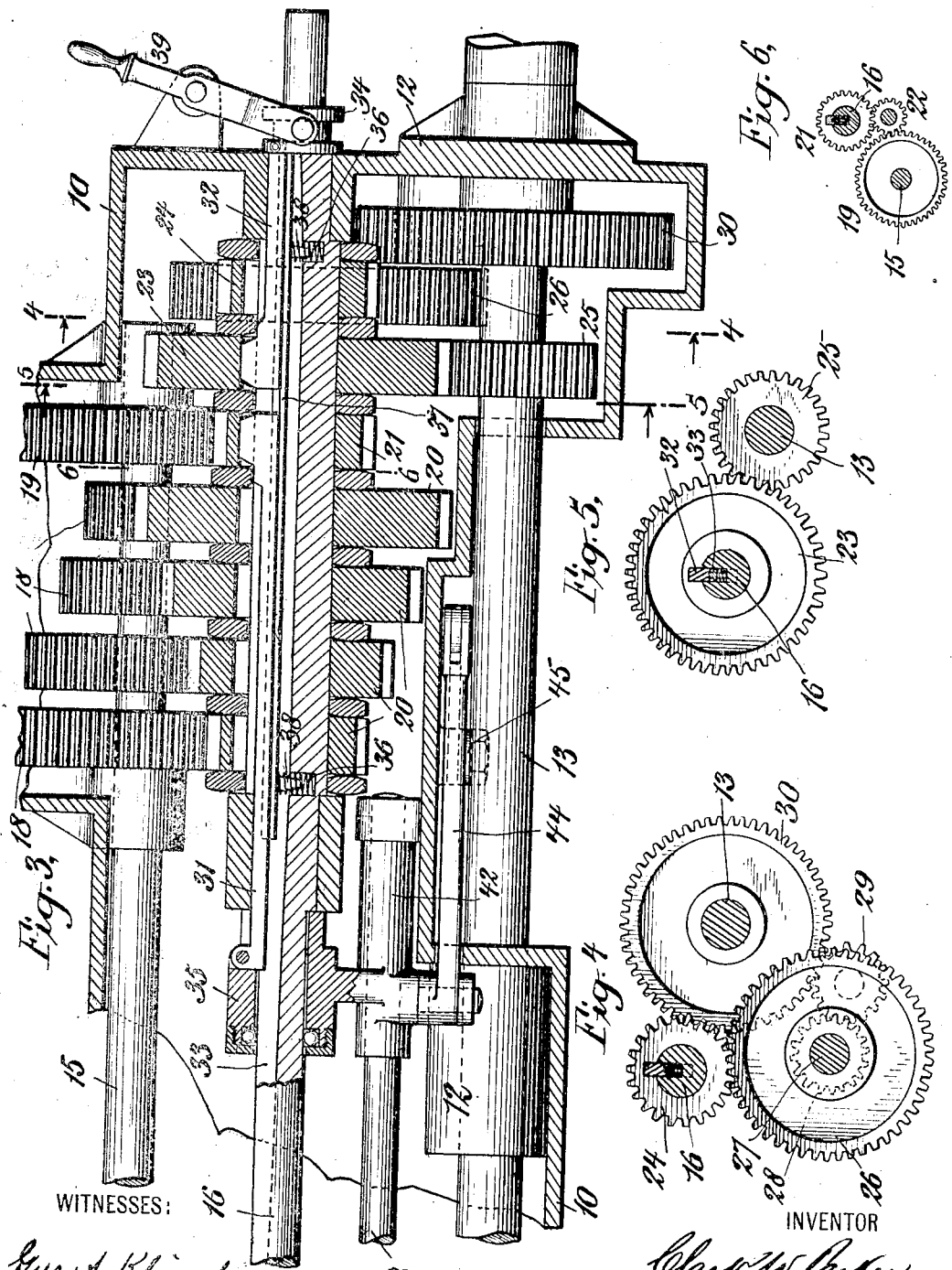
WITNESSES:
INVENTOR
BY
ATTORNEYS

UNITED STATES PATENT OFFICE.

CLARK W. PARKER, OF SPRINGFIELD, MASSACHUSETTS, ASSIGNOR TO LAMB KNITTING MACHINE CO., OF CHICOPEE FALLS, MASSACHUSETTS, A CORPORATION OF MASSACHUSETTS.

TRANSMISSION-GEARING.

No. 876,084.  Specification of Letters Patent.  Patented Jan. 7, 1908.

Application filed May 1, 1907. Serial No. 371,225.

*To all whom it may concern:*

Be it known that I, CLARK W. PARKER, a citizen of the United States of America, and a resident of Springfield, county of Hampden, State of Massachusetts, have invented certain new and useful Improvements in Transmission-Gearing, of which the following is a specification, reference being had to the accompanying drawings, forming a part thereof.

My invention relates to improvements in transmission gearing, and particularly to change speed, reverse and back gear connections for machine tools such as lathes.

The main object of my invention is to provide a simple and easily operated mechanism by which various speeds and different directions of drive may be obtained, such mechanism being self-contained and capable of being entirely inclosed within a casing. This dispenses with the usual cone pulleys, crossbelts, clutches, and so forth, which are more or less dangerous and cumbersome, and, being exposed, readily get out of order. Furthermore, the inclosing of the gearing within a casing enables the entire mechanism to run in a bath of oil, whereby wear is reduced to a minimum and the gears caused to run substantially silently.

To the above ends my invention consists in a system of gearing and controlling mechanism therefor, together with certain novel details of construction and combination of parts as will presently be described in detail.

In order that my invention may be fully understood, I will now proceed to describe a machine containing an embodiment thereof, having reference to the accompanying drawings which illustrate the same, and will then point out the novel features in claims.

In the drawings: Figure 1 is a top view of a lathe in which my improved transmission gearing is employed, the casing therefor being shown in horizontal section. Fig. 2 is a view in transverse section therethrough, the plane of section being taken substantially upon the line 2 of Fig. 1. Fig. 3 is an enlarged view in central longitudinal horizontal section through the transmission gearing. Fig. 4 is a detail transverse sectional view of the gearing upon the plane of the line 4—4 of Fig. 3. Fig. 5 is a detail transverse sectional view of the gearing upon the plane of the line 5—5 of Fig. 3. Fig. 6 is a detail transverse sectional view of the gearing upon a reduced scale, the section being taken upon the plane of the line 6—6 of Fig. 3. Fig. 7 is a detail view in side elevation of the controlling lever and certain correlated parts. Fig. 8 is a detail sectional view upon the plane of the line 8—8 of Fig. 7, showing one of the stops employed in connection with the controlling lever. Fig. 9 is a detail view showing certain link and lever connections for the controlling mechanism.

In the accompanying drawings my invention is illustrated in connection with a lathe to which the device is particularly adapted, but it will be understood that the invention may be equally applied to other machine tools and kindred mechanism. In the present instance the entire mechanism, with the exception of the controlling lever and coöperating parts, is mounted upon, and included in, the lathe head stock. This head stock comprises a casing 10, which is mounted upon the bed 11 of the lathe, said casing containing bearings 12 for supporting a shaft 13 which carries the lathe center 14. The casing is also provided with bearings for carrying a drive shaft 15, and an intermediate or driven shaft 16, the said shafts 15 and 16 being arranged to rotate about axes parallel with each other and parallel with the shaft 13. The drive shaft 15 carries a pulley 17 at one end thereof by which it may be driven, the said pulley being arranged at the exterior of the casing 10. Secured fast to the shaft 15 at a point within the casing 10 are a series of four gear-wheels 18 arranged progressively smaller from left to right, and another gear-wheel 19, which will be referred to hereinafter as a "reverse driving gear." The shaft 16 has loosely mounted thereon a series of gear-wheels 20, being progressively larger from left to right, and arranged in mesh with the gear-wheels 18, said gear-wheels 18 and 20 being respectively complementary to each other. A pinion 21 is also loosely mounted upon the said shaft 16, being disposed opposite to the gear-wheel 19 but out of mesh therewith, the said gear-wheels 19 and 21 being respectively in mesh with an idler gear-wheel 22, whereby the direction of movement imparted to the pinion 21 by the gear-wheel 19 will be opposite to that imparted by any other gear-wheel 18 to its complementary gear 20. The shaft 16 also carries loosely thereon and beyond the said gear-wheels 20 and pinion 21, a gear-wheel 23 and a pinion 24. The gear-wheel 23 is arranged in mesh with a pinion 25 mounted fast upon the lathe shaft 13, said gear-wheel 23 and pinion 25 constituting what we will herein term a direct drive for the lathe. The pinion 24, on the other hand, is arranged in mesh with a spur-gear 26 mounted upon an intermediate shaft 27, said shaft also carrying a pinion 28 which is secured fast thereto, said pinion disposed in mesh with an idler gear 29, which is in turn arranged in mesh with a spur-gear 30 secured fast upon the shaft 13. The pinion 24 is thus connected through compound gearing with the shaft 13, such compound gearing corresponding to the usual back gear of a lathe. I will refer hereinafter to the gearing comprising the pinion 24, spur-gear 26, pinion 28, idler 29, and spur-gear 30 as "back gearing" in order to distinguish it from the direct drive gearing comprised in the gear-wheel 23 and pinion 25. It will be understood that both the direct drive and the back gearing are so arranged as to impart movements to the shaft 13 in the same direction, but such movements will, of course, be at different speeds.

In order that the shaft 15 may be caused to drive the shaft 13, it will be necessary for one of the gear-wheels 20 or the pinion 21 to be secured for the time fast to the intermediate or driven shaft 16 and also to the spur-gear 23 or the pinion 24. To effect this I have provided two sliding keys 31, 32, the former of which is arranged to be moved to a position to engage any one of the wheels 20 or 21, and the latter of which is arranged to be moved to a position to engage either one of the wheels 23 or 24. The keys 31, 32 are arranged to slide in a key-way 33 in the shaft 16, the key 32 being pivotally connected at one end to a collar 34, which is slidably mounted upon the shaft 16, and the key 31 being pivotally mounted to a collar 35 also mounted to slide upon the shaft 16. The keys 31 and 32 have each a projecting portion or tooth at their free ends which are adapted to engage in key-ways with which the gear-wheels are provided. The said free ends of the keys are forced outward so as to cause the tooth portions thereof to so engage the gear-wheels opposite which they happen to be at the time by means of springs 36 and a spring presser bar 37. The spring presser bar 37 is mounted in grooves in the keys 31, 32, the said keys being permitted to slide freely with respect to said presser bar, said presser bar having downwardly extending projections 38 which are received in recesses in the shaft 16, said recesses also forming housings for the springs 36, the said springs being received within such recesses and arranged to surround the said projections 38.

The collar 34 is engaged by an operating lever 39, whereby the said collar may be slid longitudinally upon the shaft 16. This will slide the key 32 from the position in which it is shown in Fig. 3, wherein the tooth portion thereof engages the gear-wheel 23, to a position wherein the said tooth portion will engage the pinion 24. The operating lever may thus be employed to operatively connect the direct drive or the back gear in driving relation with the shaft 16.

The collar 35 is arranged to be moved longitudinally upon the shaft 16 by a controlling lever 40 carried by the tool carriage 41 of the lathe. The connections for this are as follows: The collar 35 is secured fast to a slide 42 mounted upon a stationary guide bar 43, and pivotally connected to the said slide 42 is a link 44. The outer end of the link 44 is connected to one arm of a bell crank lever 45, the other arm of which is connected by means of links 46, 47, with an arm 48 mounted upon a rock shaft 49. The controlling lever 40 is mounted upon a vertical pivot 50 carried by a hub 51 which is splined upon the shaft 49. The hub 51 partakes of the movements of the tool carriage 41, moving longitudinally upon the shaft for this purpose. Being splined to the shaft, however, it will impart rocking movements to the said shaft when the controlling lever 40 is lifted or lowered, as will be well understood. The rocking of the shaft 41 will produce corresponding rocking movements of the bell crank lever 45, and thereby sliding movements of the slide 42 and collar 35 secured thereto. The key 31 being moved longitudinally by such sliding movements of the collar 35, it will follow that movements of the controlling lever will shift the key 31 so that its tooth or projection will engage any one of the gear-wheels 20, 21 as may be desired.

In order to readily bring the controlling lever to rest at any desired position, I have provided stops 52 with which the lever may be caused to engage, there being a number of such stops provided, whereby the controlling lever may be quickly brought to rest, in any one of the predetermined positions, for causing the engagement of the tooth portion of the key 31 with a selected gear-wheel. Theses stops 52 comprise pins pivoted to the lathe carriage in such a way that they may be thrown out of the normal path of movement of the controlling lever 40, or may be moved at right angles to such position to be directly in the normal path of movement of said controlling lever. In Fig. 7 two of the pins are so shown as therein out of operative position, and the pin shown in Fig. 8 is also illustrated in such position. A spring 53, arranged to engage with the flat face of a square hub 54 upon which the pin 52 is mounted, tends to maintain the pin in any position in which it is set. When the controlling lever is in its uppermost position the key 31 will be in engagement with the pinion 21. In this position the shafts 15 and 16 will be connected for reverse driving. As the controlling lever is moved downward to a position between the next two stops, the shafts 15 and 16 will be connected in driving relation through the gears 18 and 20 nearest the gears 19, 21, 22, whereby the said shafts will be connected for forward drive at the lowest speed. When the controlling lever is moved downward to the position in which it is shown in Fig. 7, the shafts will be connected for forward drive at the second speed. Similarly, the shafts will be connected for forward driving at the third and fourth speed, the latter being the highest speed, as the controlling lever is moved down to the next and last position successively.

In lathe work it will be found a great convenience to be able to shift the lever quickly and positively from one position to another, as from second or third speed forward to reverse, as when the operation of screw cutting is being carried out, it being a simple matter also to dwell for a short time at the lowest speed before moving to reverse as the tool for cutting the screw moves towards the end of the thread to be cut. The employment of the stops, certain of which are thrown out of the normal path of movement of the controlling lever, enables such quick and positive movement to be made with a minimum of attention on the part of the operator. I have spoken of the stops as being arranged to be moved, when desired, in the "normal" path of movement of the controlling lever, for the reason that I have provided means whereby the controlling lever may be swung outward to clear the stops when desired, even when the said stops are in their operative position. It is for this reason that I have pivoted the controlling lever upon the vertical pivot 50 carried by the hub 51. A spring 55 operates to normally return the controlling lever to its normal position which is against the side of the lathe carriage 41. When desired, the controlling lever may be swung to the right against the tension of the spring 55 to clear any one or more of the stops 52, and then allowed to swing in again to such a position for instance as is shown in dotted lines in the lower part of Fig. 7.

From the foregoing it will be seen that the speed of drive and the direction of the same may be controlled by means of the lever 40, such lever moving longitudinally along the lathe bed with the tool carriage, and hence remaining in the most convenient position for the operator, who will naturally be following the tool. This will give the operator complete control of the machine, for, in addition to thus controlling the speed and direction of rotation, he may also stop the machine altogether by merely moving the controlling handle to an intermediate position. In such position the key 31 will be out of engagement with any of the gear-wheels 20, 21, and there will be no driving connection whatsoever between the shafts 15, 16. The direct drive or back gear connection is always operated initially and never changed during the operation of the machine, but the operating lever 39 will be found to be a very convenient and simple means for changing from direct drive to back gear driving whereby to initially set the machine for fast or slow speed.

It will be noticed that all the gearing and operating mechanism, other than the operating lever 39, the controlling lever 40 and the parts directly co-acting therewith, are contained within the casing 10. This will not only protect the parts, but will also protect the workmen from possible injury therefrom. Further, the casing, being an entirely closed one, enables me to run all the said moving parts, gears, etc., in a bath of oil, thereby greatly lengthening the life thereof and silencing the noise ordinarily made by gearing of this character.

What I claim is:

1. In a machine tool, the combination with a main shaft, a drive shaft, and an intermediate or driven shaft, of change speed and reverse gearing between the drive and the driven shafts, direct drive gearing and back gearing between the driven and main shafts, a sliding key in said driven shaft operated from one end of the shaft to control the change speed and reverse gearing connection, and another sliding key in the said driven shaft operated from the other end of the said shaft for controlling the direct drive and back gear, substantially as set forth.

2. In a machine tool, the combination with an inclosed casing adapted to receive and retain oil, a main shaft, a drive shaft, and an intermediate or driven shaft, of change speed and reverse gearing between the drive and driven shafts, direct drive gearing and back gearing between the driven and main shafts, said gearing contained within the said oil casing, a sliding key in said driven shaft operated from one end of the shaft to control the change speed and reverse gearing connection, and another sliding key in the said driven shaft operated from the other end of the said shaft for controlling the direct drive gearing and back gearing 3. In a machine tool, the combination with a main shaft, a drive shaft, and an intermediate or driven shaft, of a plurality of gear-wheels of different diameters arranged fast upon said drive shaft, a plurality of complementary gears in mesh therewith arranged loosely upon said driven shaft, direct drive gearing and back gearing between the driven and main shafts, the gear-wheels comprised therein upon the driven shaft being loosely mounted thereon, a sliding key mounted in said driven shaft for connecting any one of the first mentioned loose gears in operative connection therewith, another sliding key mounted in said driven shaft for connecting either one of the said loose gears of the direct drive gearing and back gearing in operative relation with the said driven shaft, and separate means for operating the said sliding keys.

4. In a machine tool, the combination with a main shaft, a drive shaft, and an intermediate or driven shaft, of change speed and reverse gearing between the drive and the driven shafts, direct drive gearing and back gearing between the driven and main shafts, a pivoted sliding key in the driven shaft for controlling the change speed and reverse gearing, another sliding pivoted key in the driven shaft for controlling the direct drive gearing and back gearing, and a yielding presser bar engaging both said keys.

5. In a machine tool, the combination with a main shaft, a drive shaft, and an intermediate or driven shaft, of change speed and reverse gearing between the drive and the driven shafts, direct drive gearing and back gearing between the driven and main shafts, a pivoted sliding key in the driven shaft for controlling the change speed and reverse gearing, another sliding pivoted key in the driven shaft for controlling the direct drive gearing and back gearing, a presser bar engaging both said keys, and springs for forcing said presser bar outward.

6. In a machine tool, the combination with a main shaft, a drive shaft, and an intermediate or driven shaft, of change speed and reverse gearing between the drive and the driven shafts, direct drive gearing and back gearing between the driven and main shafts, a pivoted sliding key in the driven shaft for controlling the change speed and reverse gearing, another sliding pivoted key in the driven shaft for controlling the direct drive gearing and back gearing, a presser bar engaging both said keys, said presser bar provided with lugs, and the driven shaft provided with sockets for receiving said lugs, and springs also received within said sockets and surrounding said lugs arranged to press the said bar outward with yielding pressure.

7. In a machine tool, the combination with a main shaft, a drive shaft, and change speed and reverse gearing between said main shaft and drive shaft, of a controlling lever for operating said change speed and reverse gearing, a plurality of stops arranged at different points to limit the movement of the controlling lever, and means whereby said stops may be moved to a position wherein they will not be engaged by the controlling lever in its movements.

8. In a machine tool, the combination with a main shaft, a drive shaft, and change speed and reverse gearing between said main shaft and drive shaft, of a controlling lever for operating said change speed and reverse gearing, a plurality of pivoted stops arranged to engage the controlling lever when moved to different points, said stops arranged to be moved about their pivots into and out of the normal path of movement of said controlling lever, and springs for retaining them in either of the positions to which they have been adjusted.

9. In a machine tool, the combination with a main shaft, a drive shaft, and change speed and reverse gearing between said main shaft and drive shaft, of a controlling lever for operating said change speed and reverse gearing, said controlling lever arranged to swing normally about an arc in one plane for such purpose, a pivotal connection for said lever permitting it to have movements at right angles to said normal plane of movements, and a purality of stops arranged at various points to limit the movements of said lever when moving in its normal plane, said lever arranged to be moved around said stops when swung about its said pivotal connection.

CLARK W. PARKER.

Witnesses:
H. H. BOWMAN,
PHILIP S. BEEBE.